United States Patent
Hatano et al.

(10) Patent No.: US 10,802,650 B2
(45) Date of Patent: Oct. 13, 2020

(54) COORDINATE INPUT DEVICE

(71) Applicant: ALPS ALPINE CO., LTD., Tokyo (JP)

(72) Inventors: Naoyuki Hatano, Miyagi (JP); Shinya Abe, Miyagi (JP); Masafumi Takagi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/504,489

(22) Filed: Jul. 8, 2019

(65) Prior Publication Data

US 2019/0332242 A1 Oct. 31, 2019

Related U.S. Application Data

(63) Continuation of application No. PCT/JP2017/044409, filed on Dec. 11, 2017.

(30) Foreign Application Priority Data

Jan. 17, 2017 (JP) .................................. 2017-005865

(51) Int. Cl.
  *G06F 3/0354* (2013.01)
  *G06F 3/044* (2006.01)
  *G06F 3/041* (2006.01)

(52) U.S. Cl.
  CPC ...... *G06F 3/04186* (2019.05); *G06F 3/03547* (2013.01); *G06F 3/044* (2013.01)

(58) Field of Classification Search
  CPC .............. H03J 1/0025; H04N 21/4126; H04N 21/42224; H04N 5/4403;
  (Continued)

(56) References Cited

U.S. PATENT DOCUMENTS

2005/0024326 A1* 2/2005 Betts-LaCroix ...... G06F 3/0416
  345/156
2010/0328351 A1* 12/2010 Tan ......................... G06F 3/041
  345/661

(Continued)

FOREIGN PATENT DOCUMENTS

JP 2002-244809 8/2002
JP 2006-268665 10/2006

(Continued)

OTHER PUBLICATIONS

International Search Report for PCT/JP2017/044409 dated Feb. 20, 2018.

*Primary Examiner* — Nitin Patel
*Assistant Examiner* — Amen Woldesenbet Bogale
(74) *Attorney, Agent, or Firm* — IPUSA, PLLC

(57) ABSTRACT

A coordinate input device includes an operation detecting unit for detecting an input operation performed by an operation body and a calculation unit for computing a calculation result from the input operation, wherein, in a case where the input operation detected by the operation detecting unit continues for a predetermined time, the calculation unit acquires a first position coordinate at a first time and a second position coordinate at a second time is detected after the first time, calculates an input vector from the first position and directed toward the second position, calculates a movable distance between an end and another end of the operation detecting unit on a line connecting the first position and the second position, and computing an output vector by increasing a correction value for correcting a value of the input vector so that the shorter the movable distance, the larger the correction value is.

6 Claims, 9 Drawing Sheets

(58) Field of Classification Search
CPC ............ H04N 2005/4408; G01C 21/36; G01C 21/3617; G01C 21/3664
See application file for complete search history.

(56) References Cited

U.S. PATENT DOCUMENTS

| | | | |
|---|---|---|---|
| 2011/0050566 A1* | 3/2011 | Sawai | G06F 3/048 345/157 |
| 2011/0285657 A1* | 11/2011 | Shimotani | G06F 3/0416 345/173 |
| 2012/0030636 A1* | 2/2012 | Miyazaki | G06F 3/04847 715/863 |
| 2013/0120129 A1 | 5/2013 | Tippelhofer et al. | |
| 2014/0146076 A1* | 5/2014 | Kim | G06T 11/60 345/619 |
| 2015/0286302 A1* | 10/2015 | Kim | G06F 3/0488 345/173 |
| 2015/0355727 A1* | 12/2015 | Hu | G06F 40/274 345/169 |
| 2015/0355779 A1 | 12/2015 | Kanamori | |
| 2016/0054848 A1* | 2/2016 | Maeda | H04N 1/00411 345/173 |
| 2019/0155493 A1* | 5/2019 | Fujibayashi | G06F 3/0488 |

FOREIGN PATENT DOCUMENTS

| | | |
|---|---|---|
| JP | 2011-048525 | 3/2011 |
| JP | 2014-186555 | 10/2014 |
| JP | 2015-535117 | 12/2015 |
| JP | 2016-103214 | 6/2016 |

* cited by examiner

COORDINATE INPUT DEVICE

CROSS-REFERENCE TO RELATED APPLICATION

This application is a continuation application of International Application No. PCT/JP2017/044409 filed on Dec. 11, 2017, and designated the U.S., which is based upon and claims the benefit of priority of the prior Japanese Patent Application No. 2017-005865, filed on Jan. 17, 2017, the entire contents of which are incorporated herein by reference.

BACKGROUND OF THE INVENTION

1. Field of the Invention

The present invention relates to a coordinate input device such as a touch-pad.

2. Description of the Related Art

Conventionally, as a coordinate input device such as a notebook personal computer, a touch-pad is known for performing an operation or scrolling of a screen by touching the operation surface with a finger. Further, in recent years, a touch panel has been used as the coordinate input device such as a smartphone or tablet terminal.

Coordinate input devices that allow intuitive operations of the devices with fingers, etc. of persons have been used in many devices as well as personal computers and information terminals such as smartphones. For example, the coordinate input devices are used in automobiles for the operation of car navigation systems or for the operation of audio equipment.

In recent years, a variety of methods have been proposed for improving operability in the coordinate input devices. For example, U.S. Patent Document 1 discloses a technique that utilizes information on the contact state of an operation body such as a finger or a touch pen with an operating surface and the position of an operation body in a proximity state after a finger is removed from the operating surface.

In the coordinate input device disclosed in Patent Document 1, in a contact state of an operation surface, a screen is scrolled at a speed corresponding to the movement direction, movement distance, and movement speed of the operation body. A vector is specified by using a proximity position when the operation body is moved away from the contact state to a proximity state, and the speed of the scroll is changed according to the direction or length of the vector. Patent Document 1 states that the operability of the coordinate input device can be improved by performing such processing.

In addition, Patent Document 2 discloses a touch panel device that can easily determine the direction and speed of a movement in a displayed image by detecting the pressure of an operation body even in a case where an area sufficient to operate the operation body is not secured in an operating surface.

BACKGROUND ART DOCUMENT

[Patent Document]
[Patent Document 1] Japanese Unexamined Patent Application Publication No. 2014-186555
[Patent Document 2] Japanese Unexamined Patent Application Publication No. 2016-103214

SUMMARY OF THE INVENTION

In an apparatus operated by such a coordinate input device, the coordinate input device for the operation may be positionally separated from a display device for displaying the operated status. For example, in the operation of the apparatus in an automobile, a touch-pad is provided on the upper surface of the shift lever or the steering wheel, and the operation for car navigation is performed by the operation on the touch-pad. In such a case, the user will operate without seeing the touch-pad.

In addition, in such a coordinate input device, the shape cannot be rectangular due to the size constraint or design reasons of the device to be installed, and may be circular, elliptical, or other geometric shapes.

For example, if the coordinate input device is circular, when dragging (sliding a finger or the like in contact with the surface of the coordinate input device) near the center point, it is possible to drag up to the same distance as the diameter of the circle of the coordinate input device.

However, when dragging away from the central point of the coordinate input device, a finger or the like can be dragged only a short distance. In this case, if the user wishes to drag a long distance, the user should remove the finger or the like from the surface of the coordinate input device once, return the finger or the like to the original position, and drag the finger or the like again from the original position. There may be a case where drags of multiple times are required.

In the apparatus disclosed in Patent Document 1, when a finger, etc. reaches an end of the coordinate input device during a drag operation, a finger, etc. leaves the surface of the coordinate input device. However, because the proximity position of a finger, etc. away from the surface cannot be detected by the coordinate input device, the vector of the operation cannot be accurately detected. In this case, because the length of the vector is short, the dragging operation is also short so as to possibly cause a feeling of strangeness for the user.

In Patent Document 2, the case where a sufficient area for operating the operating object cannot be secured is dealt with by detecting the pressure of the operating object. In Patent Document 2, the case where a sufficient area for operating the operating object cannot be secured is dealt with by detecting the pressure of the operating object. However, when the user operates without seeing the operating surface, it is impossible to check whether an operable distance is long or short in advance. Accordingly, the user cannot take measures such as intensifying the operation in advance.

The present invention is provided to improve the coordinate input device, and, more particularly, to provide the coordinate input device such as the touch-pad without causing a feeling of strangeness to the user when the user inputs regardless of the shape of the coordinate input device.

Means for Solving Problems

A coordinate input device including an operation detecting unit configured to detect an input operation performed by an operation body; and a calculation unit configured to compute a calculation result by calculating the result of the input operation, wherein, in a case where the input operation detected by the operation detecting unit continues for a predetermined time, the calculation unit acquires a first position coordinate of a first position at a first time and a second position coordinate of a second position at a second time that is detected after the first time, calculates an input vector that starts from the first position and directed toward the second position, calculates a movable distance that is a distance between an end of the operation detecting unit and another end of the operation detecting unit on a line connecting the first position and the second position, and computing an output vector by increasing a correction value for correcting a value of the input vector so that the shorter the movable distance, the larger the correction value is.

According to the coordinate input device of the present invention, the length of the operation detecting unit on the line connecting the first position and the second position, that is, the movable distance that the operation body can move, is calculated, and the smaller the movable distance, the larger the output vector relative to the input vector. According to this configuration, even if the shape of the coordinate input device is different depending on the operation position of the operation body, the output vector relative to the input vector is corrected by the calculation unit. Accordingly, even when the operation body can operate only a short distance, it is possible to have the user perform the input operation without causing a feeling of strangeness.

A coordinate input device including an operation detecting unit configured to detect an input operation performed by an operation body; and a calculation unit configured to compute a calculation result by calculating the result of the input operation, wherein, in a case where the input operation detected by the operation detecting unit continues for a predetermined time, the calculation unit acquires a first position coordinate of a first position at a first time and a second position coordinate of a second position at a second time that is detected after the first time, calculates an input vector that starts from the first position and directed toward the second position, acquiring a length of a perpendicular line from a line connecting the first position and a second position to a reference point of the operation detecting unit, and computing an output vector by increasing a correction value for correcting a value of the input vector so that the shorter the movable distance, the larger the correction value is.

According to the coordinate input device of the present invention, the length of a perpendicular line from a line connecting a first position and a second position operated by the operation body to the reference point of the operation detecting unit is calculated by the calculation unit. The longer the length of the perpendicular line, that is, the farther away from the reference point of the operation detecting unit, the greater the output vector relative to the input vector is. Accordingly, even when the movable distance of the operation body is short at a position away from the reference point in the coordinate input device, the input operation can be performed without causing the user to feel strangeness. It is preferable that this reference point be the center of the shape of the operation detecting unit. However, it may be appropriately determined according to an apparatus to be applied.

The coordinate input device of the present invention is particularly preferable when the shape of the operation detecting unit is circular, elliptical, or rectangular.

Further, in the coordinate input device of the present invention, the calculation unit calculates the movement speed of the operation body from the time between the first time and the second time and the amount of movement from the coordinate of the first position to the coordinate of the second position, and preferably reduces the correction value when the movement speed is lower than a predetermined threshold value.

When the user wishes to operate the operation detecting unit accurately, the movement speed of the operation body is slowed. Therefore, when the movement speed of the operation body is equal to or lower than a threshold value, the correction amount is reduced, and the user can perform the input operation without causing a feeling of strangeness.

DESCRIPTION OF THE EMBODIMENTS

Referring to FIGS. 1 to 4B, an coordinate input device of the first embodiment of the present invention is described. The coordinate input device 1 of the first embodiment includes a touch-pad 2 and a controller 3, and is configured to display a result of an operation given to the touch-pad 2 on the display 4.

Figure 2:
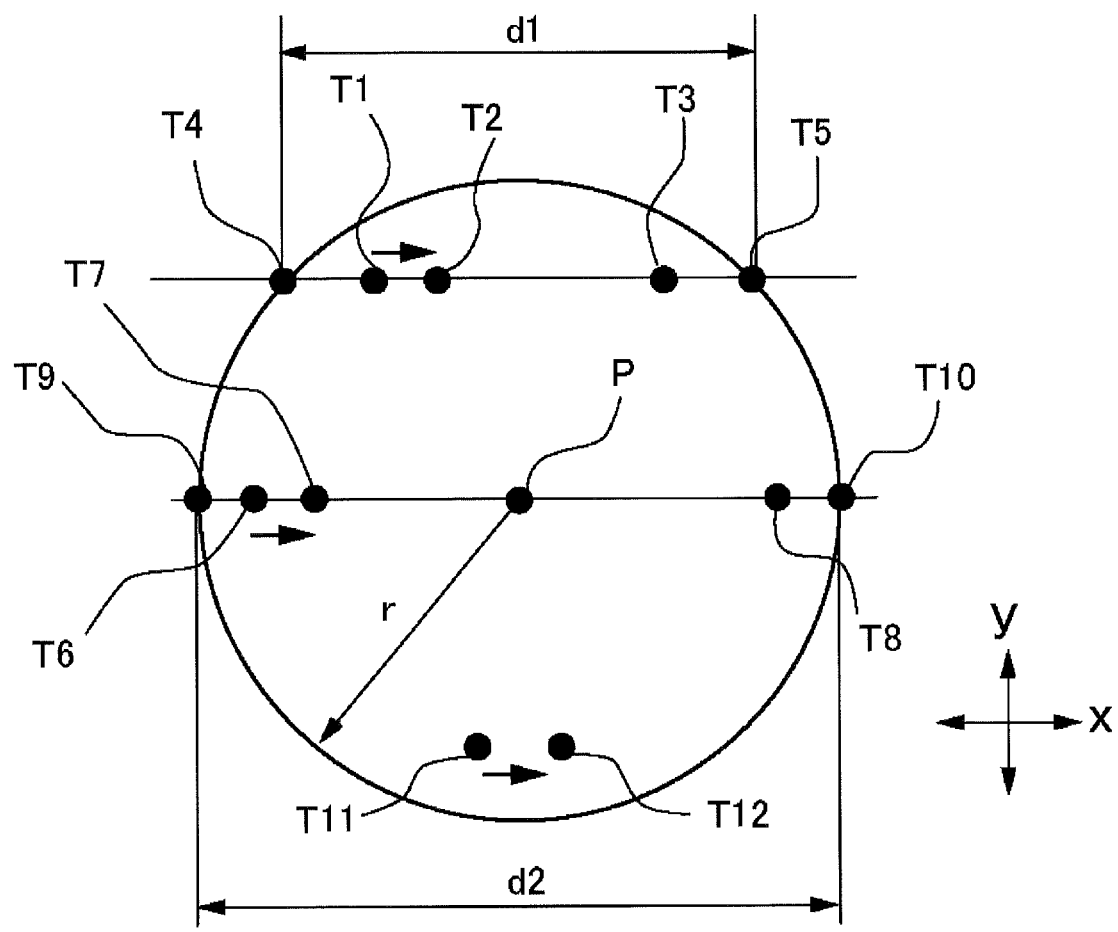
FIG. 2 explains a locus of a finger and a detection point of a coordinate of in a touch-pad.
Figure 3:
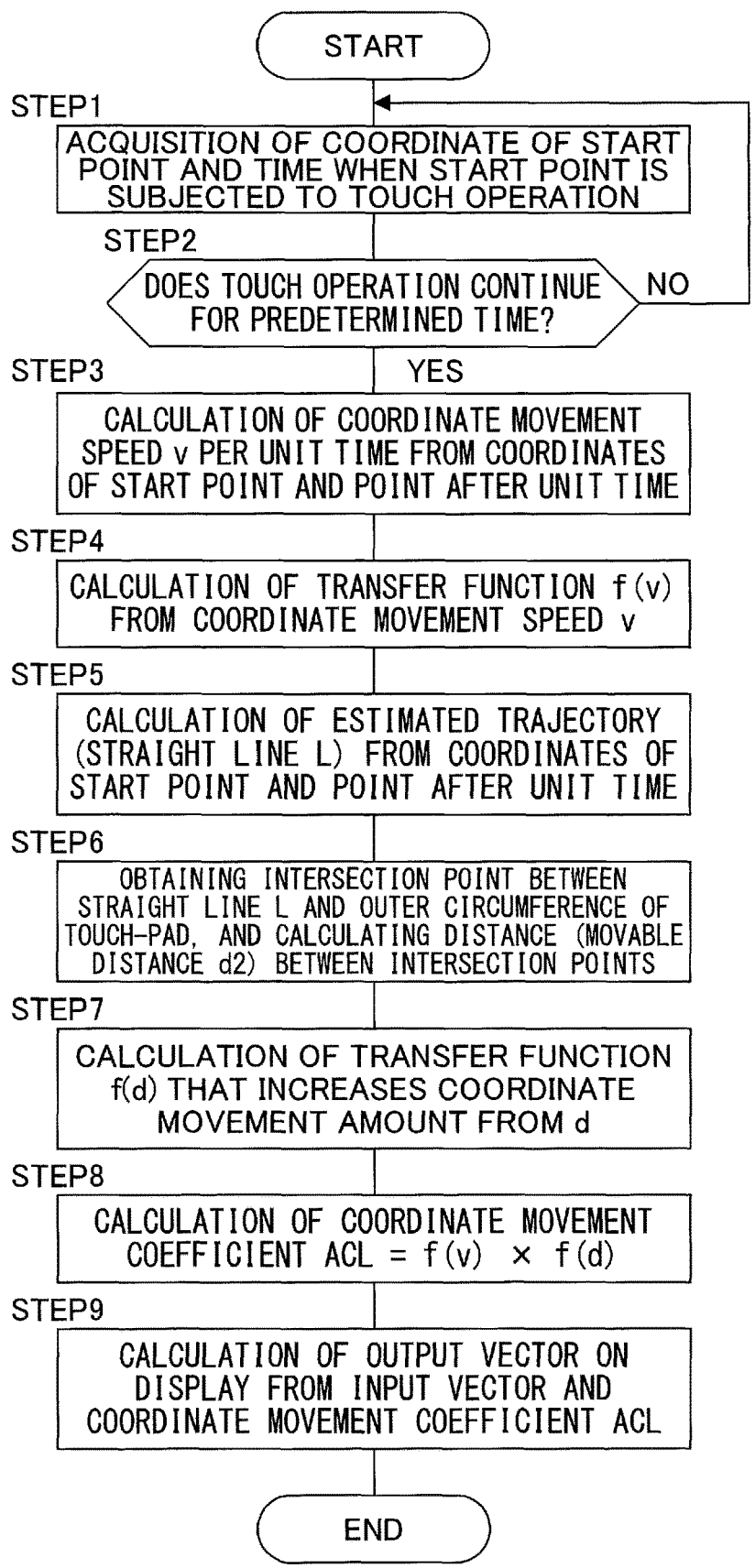
FIG. 3 is a flow chart illustrating operation in the coordinate input device of the first embodiment.

The touch-pad 2 corresponds to an operation detecting unit according to the present invention and is provided around the driver's seat. The touch-pad 2 is used for a car navigation system, car audio, or car air conditioner, or the like. As illustrated in FIG. 2, the shape of the touch-pad 2 is a circle having a radius r with the central point P as the reference point. The outer circumference of the touch-pad 2 is represented by the expression "x2+y2=r2" when the right and left directions in FIG. 2 are the x direction and the up and down directions are the y direction.

In addition, the touch-pad 2 has an electrostatic capacitance sensor (not illustrated) on its surface. The touch-pad 2 detects an electrostatic capacitance that changes when an operation body, such as a user's finger and a touch pen, is touched, and detects an operation of the operation body. The touch-pad 2 is not limited to an electrostatic capacitance detection type, but may be a pressure detection type or the like.

The controller 3 is composed of an electronic device such as a CPU (central processing unit), a memory, or an interface. The controller 3 includes an input unit 5 for inputting data transmitted from the touch-pad 2, a calculation unit 6 for performing various processing of the input data, a memory unit 7 for storing various types of data, and an output unit 8 for outputting various types of data.

In the calculation unit 6, a signal transmitted from the touch-pad 2 is received every unit time (e.g., every 0.01 seconds), and the type of operation is determined from the coordinate, the operation duration, the movement direction, or the length of the movement distance of the operation performed on the touch-pad 2. The operations performed on the touch-pad 2 include tapping (tapping once with a finger), double tapping (tapping twice with a finger), dragging (moving an icon, etc.), swipe (lightly sweeping), flick (scrubbing an icon, etc.), pinch-in (holding with two fingers), pinch-out (spreading with two fingers), and hold (fixedly pushing with a finger).

The display 4 is used, for example, for a display for a car navigation system to display car navigation information as well as operation information of car audio, car air conditioner, or the like. The display 4 may also be a display of the type reflecting and displaying on the front wind shield glass of the vehicle and may be a display provided in the meter panel.

The memory unit 7 is composed of a memory medium such as a RAM or a ROM and stores data input from the input unit 5 and data used for the operation in the calculation unit 6. The memory unit 7 also stores a program for operating the coordinate input device 1 of the present invention.

Figure 1:
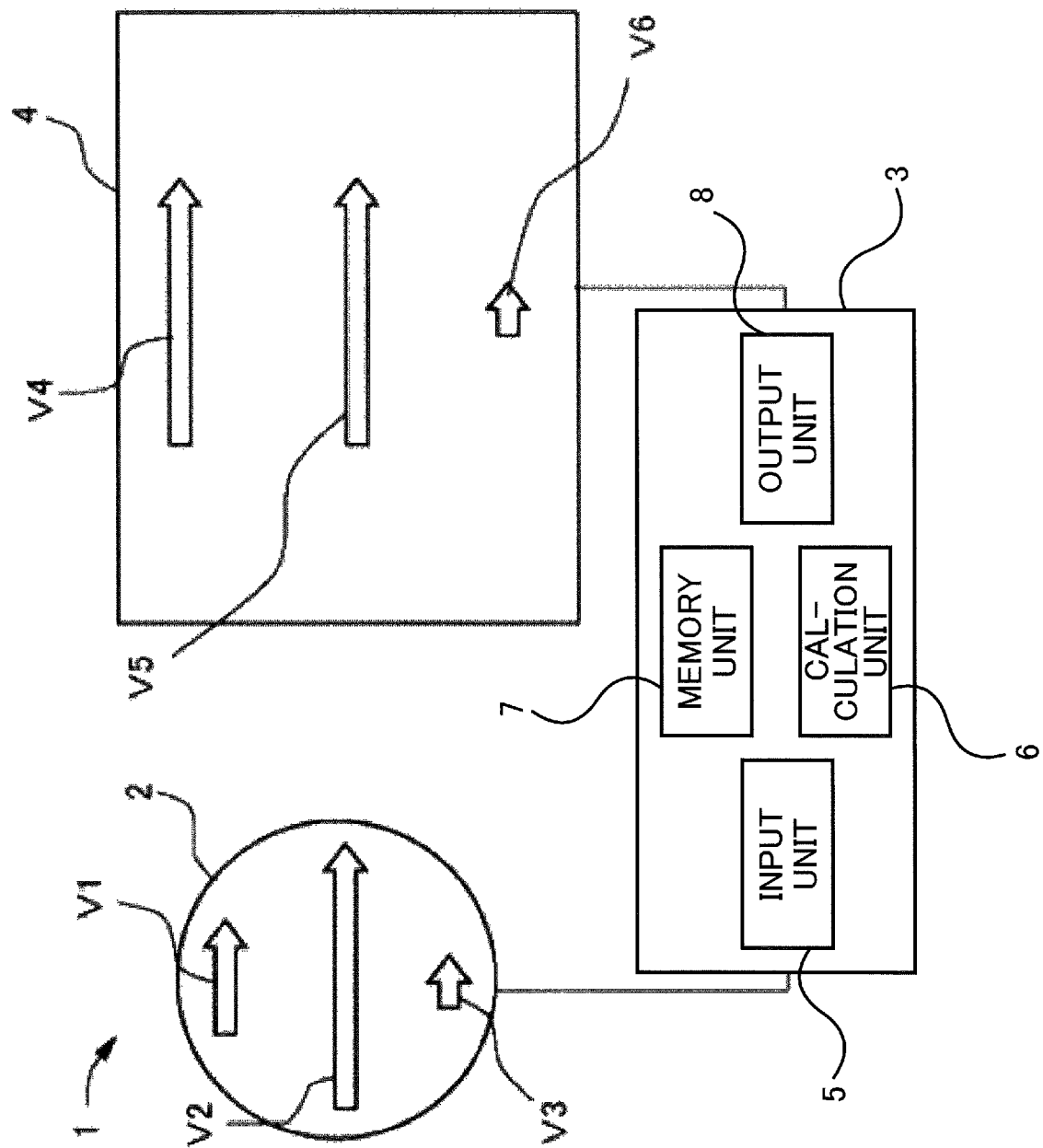
FIG. 1 illustrates the structure of a coordinate input device according to a first embodiment of the present invention.

Next, operation in the coordinate input device 1 of the first embodiment will be described. FIG. 1 shows the movement of the finger when the user drags the surface of the touch-pad 2 and the movement of the finger when the operation of the finger is displayed on the display 4. A vector V1 in FIG. 1 shows the input vector when dragging around the outer circumference of touch-pad 2, and a vector V2 shows the input vector when dragging around the center of touch-pad 2. A vector V3 also shows the input vector when slowly dragging around the outer circumference of touch-pad 2.

In the display 4, a vector V4 shows the display movement when the input vector V1 is operated by the user, and a vector V5 shows the display movement when the input vector V2 is operated. A vector V6 shows the display movement when the input vector V3 is operated.

As illustrated in FIG. 1, in the coordinate input device 1 of the first embodiment, the calculation unit 6 of the controller 3 is set such that the output vector V4, which is the result of being dragged at a short distance near the outer circumference of the touch-pad 2 by the input vector V1, and the output vector V5, which is the result of dragging at a long distance near the center of the touch-pad 2 by the input vector V2, have the same length.

In the input vector V1, the user drags the vicinity of the outer circumference of the touch-pad 2 with his/her fingers, but in the vicinity of the outer circumference of the touch-pad 2, the length of the finger movement is shorter than in the vicinity of the center. A point T1 in FIG. 2 is the start point at which the fingers touch the touch-pad 2, and a point T3 is the end point.

When the user touches the start point T1 on the touch-pad 2 with the user's finger, the calculation unit 6 acquires the coordinates of the start point T1 and the time when the start point T1 is touched from the data transmitted from the touch-pad 2 (STEP1). When the user drags the user's finger in the direction toward the end point T3, the calculation unit 6 acquires the position of the user's finger in the touch-pad 2 every unit time. Therefore, the coordinate of the user's finger is input to the calculation unit 6 every unit time.

A point T2 in FIG. 2 is the position of the user's finger detected after a unit time from the start point T1 at which the user's finger touched touch-pad 2. In this embodiment, when the input operation to the touch-pad 2 continues n times (e.g., twice) the unit time (YES in STEP 2), the correction process is performed for the input vector by the input operation so as to determine the output vector in the display 4.

In FIG. 2, when the user drags the touch-pad 2 from the start point T1 to the end point T3 with the user's finger, the drag operation is an operation of n times or more of the unit time. Therefore, the following process is performed in the calculation unit 6.

Figure 4A:
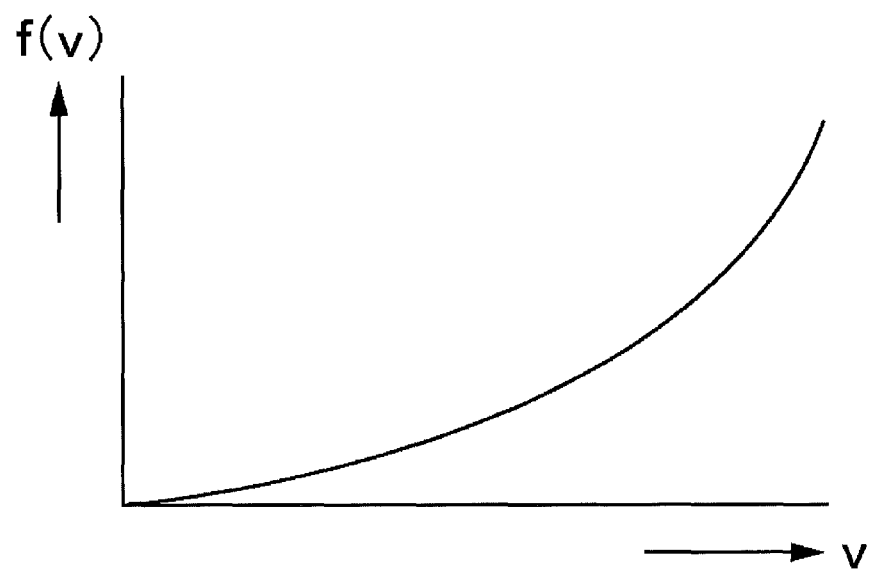
FIG. 4A is a graph illustrating the relationship between the speed v of the operation and a transfer function f(v).
Figure 4B:
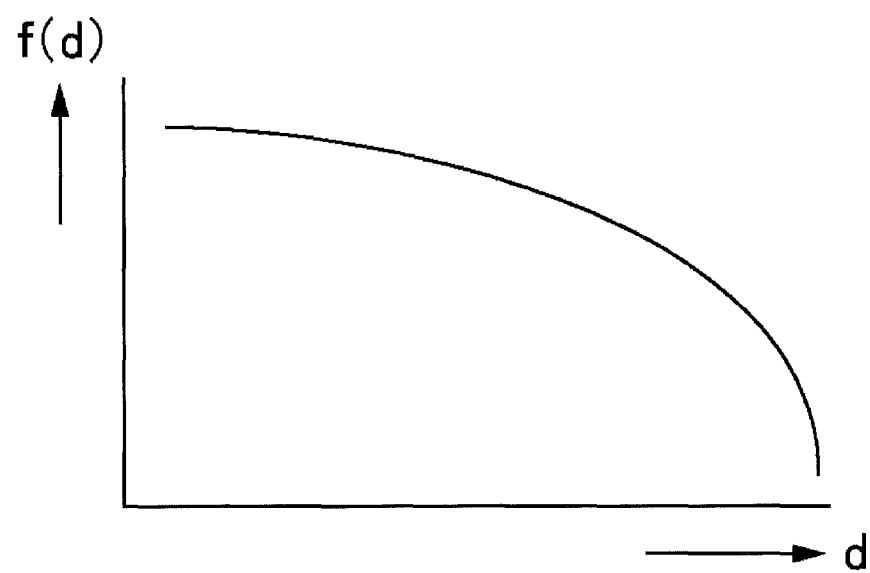
FIG. 4B is a graph illustrating the relationship between the movable distance of the operation body and the transfer function f(d).

First, the coordinate (x1, y1) and time of the start point T1 is obtained, and the coordinate (x2, y2) and time at the point T2 after the unit time are obtained. Next, in the calculation unit 6, the movement speed v of the finger is calculated from the above information (STEP3) and the transfer function f(v) is calculated (STEP4). The transfer function f(v) uses, for example, the Weber-Fechner law, which states that the amount of sensation is proportional to the logarithm of the amount of stimulus, and uses a function that increases nonlinearly to fit human senses (Equation 1). FIG. 4A shows a graph of the function of Equation 1, wherein the vertical axis is a multiplier that increases, and the horizontal axis is the speed of the finger.

[Formula 1]

$$f(v)=0.0625\times(\exp^{0.01v}-1) \qquad \text{(EQUATION 1)}$$

Next, the primary function of the direction of movement of the finger is obtained from these coordinates. Specifically, the movement of the fingers from the start point T1 to the point T2 after the unit time is estimated based on the movement of the finger. This estimation is recognized as a straight line L. This straight line L is represented by the expression "ax+by+c=0". The slope derived from the expression of the straight line L and the coordinates of the above two points are calculated to find coefficients a, b, and c in the expression (STEP5).

The outer circumference of the touch-pad 2 is represented by the expression "x2+y2=r2". Here, the coordinates of the two intersection points T4 and T5, i.e., the straight line L obtained from the moving direction from the start point T1 to the point T2 and the outer circumference of the touch-pad 2, are calculated using an expression representing a straight line L and an expression representing the outer circumference of the touch-pad 2, and the distance d1 between the points T4 and T5 is obtained (STEP6). This distance is the movable distance in which the finger can move on the touch-pad 2 in the direction of straight line L through the start point T1.

Next, the transfer function f(d) that increases the coordinate movement amount of movement in the coordinate of moving the coordinate is calculated based on the distance d1 between the two points (STEP7). The transfer function f(d) uses a function where f(d) increases as d decreases. For example, the transfer function f(d) representing the transfer function f(p) proportional to the length p of the perpendicular line drawn from the center P of the touch-pad to the straight line L as a distance d is represented by a graph such as that illustrated in FIG. 4B. The transfer function f(p) is described later. The distance d1 between the points T4 and T5 that is shorter than the diameter 2r of the touch-pad 2. Therefore, the transfer function f(d) is larger than 1.

Next, the calculation unit 6 calculates a coordinate movement coefficient ACL when converting the input vector V1 to the output vector V4 (STEP8). This coordinate movement coefficient is obtained by "ACL=f(d)×f(v)". Then, the coordinate of the output vector V4 is obtained from the input vector V1 and the coordinate movement coefficient ACL (STEP9).

The input vector V1 is obtained from the length and direction from the start point T1 (x1, y1) to the end point T3 (x3, y3). The coordinate of the output vector V4 is obtained by multiplying the input vector V1 by the coordinate movement coefficient ACL. Thus, the coordinate of the output vector V4 obtained by the calculation unit 6 is transmitted to the display 4 via the output unit 8, and the operation trajectory of the output vector V4 is displayed on the display 4.

The above operation is performed in a manner similar to that in the input vector V2. In the input vector V2, the user operates by dragging at a position through the central point P of the touch-pad 2. First, the coordinate (x6, y6) of the start point T6 is obtained, and the coordinate (x7, y7) at the point T7 after the unit time is obtained. Next, the straight line L is calculated based on the movement of the finger from the start point T6 to the point T7 after the unit time. Next, the coordinates of the two intersection points T9 and T10 between the straight line L and the outer circumference of the touch-pad 2 are calculated, and the distance d2 (movable distance) between the intersection points is obtained.

Next, the transfer function f(d) that increases the coordinate movement amount of movement in the coordinate is calculated based on the distance d2 between the two points. In the input vector V2, this distance d2 is the largest position in touch-pad 2. For this reason, the output of the transfer function f(d) is 1.

Next, the transfer function f(v) is calculated based on the velocity v of the finger between the two points. Thereafter, the calculation unit 6 calculates a coordinate movement coefficient ACL when converting an input vector V2 (the start point T6 to the end point T8) to the output vector V5. This coordinate movement coefficient is acquired by "ACL=f(d)×f(v)". Then, the coordinate of the output vector V5 is obtained from the input vector V2 and the coordinate movement coefficient ACL.

Because the output of the transfer function f(d) is 1 in the input vector V2, the coordinate movement coefficient ACL is the same value as the transfer function f(v). In FIG. 1, the transfer function f(v) is set to 1, and the coordinate movement coefficient ACL is also set to 1. Accordingly, by the user inputting the input vector V2 with the finger, the output vector V5 having a length similar to the input vector V2 is displayed on the display 4.

On the other hand, the input vector V3 in FIG. 1 is the input vector when the user moves the finger slowly. For example, if the user makes some fine-tuning with a touch operation, the finger is moved slowly. In FIG. 2, if the fingers are moved slowly from the start point T11 to the end point T12, the operation speed detected by the touch-pad 2 is slowed, so that the value of the transfer function f(v) is reduced. The threshold for determining whether the finger moves slowly can be determined according to the product to be applied.

Accordingly, the value of the coordinate movement coefficient ACL obtained by the calculation unit 6 is also reduced. Accordingly, the incremental magnification of the output vector V6 relative to the input vector V3 is also reduced, so that the output vector V6 has a length approximately equal to that of the input vector V3.

In the coordinate input device 1 of the first embodiment, the movable distance within the touch-pad 2 is calculated from the trajectory of the user's finger, and the input vectors V1 to V3 are converted to the output vectors V4 to V6 using the movable distance and the speed of operation of the fingers.

Thus, even when the shape of the touch-pad 2 is different from that of the display 4, a result similar to the user's sense of operation is obtained on the display 4. Said differently, the shorter the movable distance, the larger the magnitude of the output vector relative to the input vector, so that the length of the output vector can be sufficiently increased even when the vicinity of the edge of the touch-pad 2 is touched.

Therefore, according to the present invention, it is possible to deform the touch-pad 2 in conformity with the device to which the shape of the touch-pad 2 is applied without causing a feeling of strangeness to the user. The shape of the touch-pad 2 can be a round shape, such as an ellipse or an oval with rounded corners, or can be a rectangular shape, such as a diamond shape, pentagon shape, or other polygon shape.

Next, a coordinate input device 1a within a second embodiment will be described with reference to FIGS. 5 to 10. The coordinate input device 1a of the second embodiment is the same as the first embodiment in the hardware structure, and the calculation for determining the output vectors V9 and V10 from the input vectors V7 and V8 in the calculation unit 6 is different from the first embodiment. In the second embodiment, when the features are similar to those of the first embodiment, the same reference numerals are attached and the detailed explanation thereof is omitted.

Figure 5:
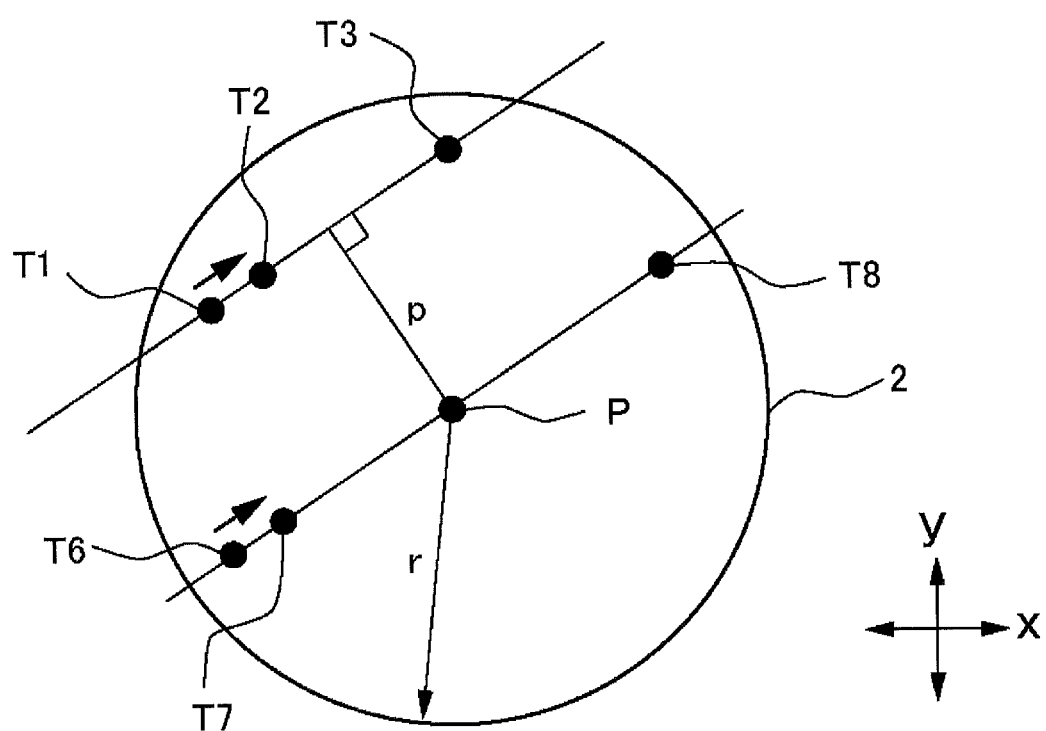
FIG. 5 explains a locus of a finger and a detection point in a coordinate in a touch-pad of a second embodiment.
Figure 6:
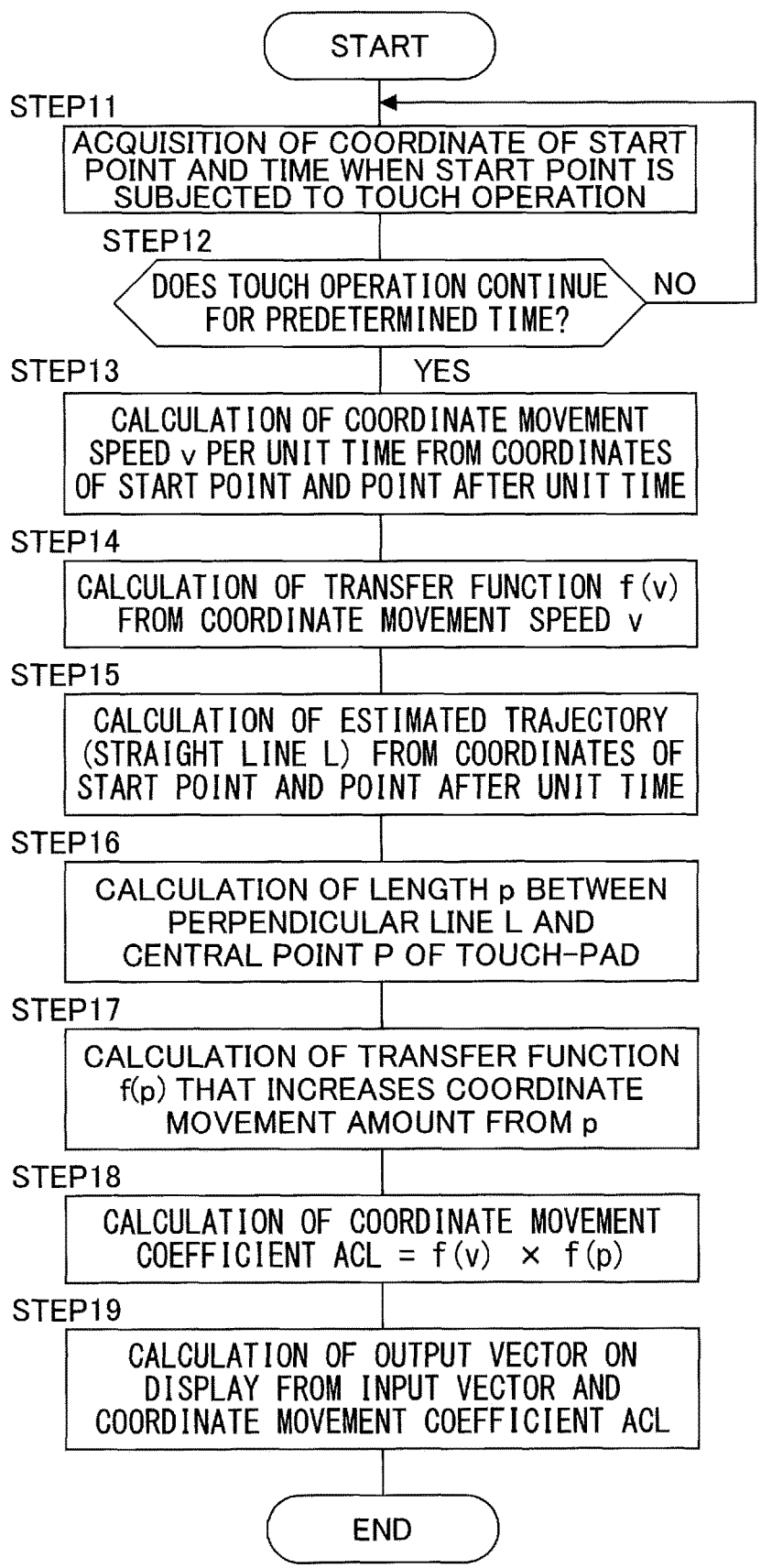
FIG. 6 is a flow chart illustrating operation in a coordinate input device of the second embodiment.

In the second embodiment, as illustrated in FIG. 5, the distance p from the central point P as the reference point of the touch-pad 2 to the vector operated by the user's finger is calculated, and the coordinate movement coefficient ACL is obtained in conformity of the distance p. The point T1 in FIG. 5 is the start point at which the finger touches the touch-pad 2, and the point T3 is the end point.

When the user touches the start point T1 of the touch-pad 2 with the finger, the calculation unit 6 acquires the coordinate of the start point T1 and the time when the finger touched by the data transmitted from the touch-pad 2 (STEP11). When the user drags the finger in the direction toward the end point T3, the calculation unit 6 acquires the position of the finger in the touch-pad 2 every unit time. Therefore, the coordinate of the finger is input to the calculation unit 6 every unit time.

The point T2 in FIG. 5 is the position of the finger detected after the unit time from the start point T1 at which the finger touched on the touch-pad 2. In the calculation unit 6, the coordinate (x1, y1) of the start point T1 are acquired, and the coordinate (x2, y2) at the point T2 after the unit time are acquired. When the input operation to the touch-pad 2 continues n times (e.g., twice) the unit time (YES in STEP12), in the calculation unit 6, the finger movement speed v is calculated from the above information (STEP13) and the transfer function f(v) is calculated (STEP14).

Figure 7:
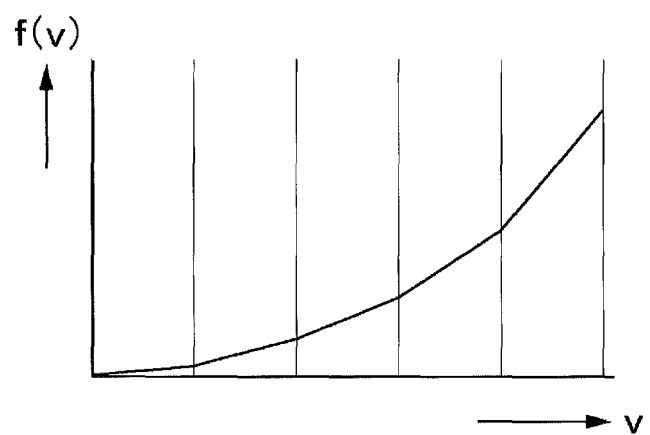
FIG. 7 is a graph illustrating the relationship between the speed v of the operation and the transfer function f(v).

In the present exemplary embodiment, the transfer function f(v) is not the above-described Equation 1, but is a first order function with a gradually increasing slope as illustrated in FIG. 7 connected thereto. Such a transfer function f(v) can also be determines such that the rate of increase to fit the human sense of operation.

Next, in the calculation unit 6, the coefficients a, b, and c of the straight line "ax+by+c=0," which is the primary function of the movement direction of the finger, are obtained from these coordinates (STEP15). Next, the length of the perpendicular line p from the straight line L to the coordinate "x0, y0" of the central point P of the touch-pad 2 is obtained (STEP16). The length of the perpendicular line p is obtained by Equation 2 below.

[Formula 2]
$$p = \frac{|ax_0 + by_0 + c|}{\sqrt{a^2 + b^2}} \quad \text{(EQUATION 2)}$$

In the calculation unit 6, after the length p of the perpendicular line is obtained, the transfer function f(p), which is a magnification that increases the amount of coordinate movement from the length p of the perpendicular line, is calculated (STEP17). The transfer function f(p) is the function illustrated in Equation 3 below. Here, if the user places the finger on a straight line through the central point P of the touch-pad 2 and drags the straight line, p=0, the length of the straight line L is twice the radius r, i.e., the same length as the diameter of the touch-pad 2. The rate of increase in this condition is GMIN. On the other hand, if the user touches the outer circumference of the touch-pad 2, the length of the straight line L becomes 0. The rate of increase in this condition is GMAX.

[Formula 3]
$$f(p) = G_{MIN} + \frac{d(G_{MAX} - G_{MIN})}{r} \quad \text{(EQUATION 3)}$$

The transfer function f(p) schematically shows an impression in which the rate of increase gradually increases as the location is changed from the central point P of the touch-pad 2 to the outer circumference.

Thereafter, the calculation unit 6 calculates the coordinate movement coefficient ACL when converting the input vector V7 to the output vector V9 (STEP18). This coordinate movement coefficient is obtained by "ACL=f(v)×f(p)". Then, the coordinate of the output vector V9 is obtained from the input vector V7 and the coordinate movement coefficient ACL (STEP19).

The input vector V7 is determined in the length and direction from the start point T1 (x1, y1) to the end point T3 (x3, y3). The coordinate of the output vector V9 is obtained by multiplying the input vector V7 by the coordinate movement coefficient ACL. Thus, the coordinate of the output vector V9 determined by the calculation unit 6 is transmitted to the display 4 via the output unit 8, and the operation trajectory of the output vector V9 is displayed on the display 4.

Figure 8:
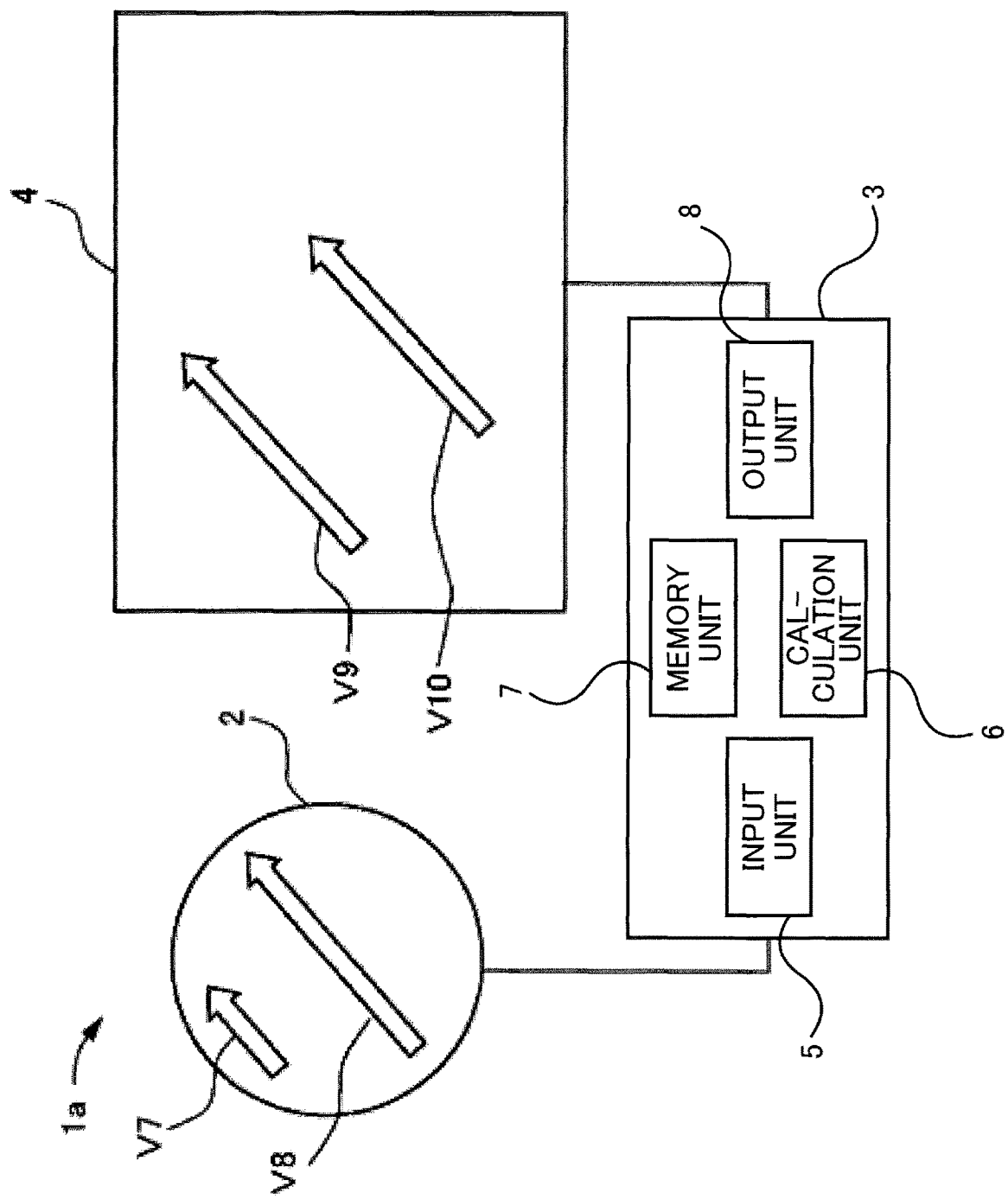
FIG. 8 explains the structure of the coordinate input device according to the second embodiment of the present invention.

FIG. 8 is a diagram illustrating the trajectory of the fingers in touch-pad 2 and the trajectory of the display in the display 4. The output vector V9 shows the movement on the display when the touch operation (input vector V7) is performed near the outer circumference of the touch-pad 2 by the user, and the output vector V10 shows the movement on the display when the touch operation (input vector V8) is performed near the center of the touch-pad 2.

As illustrated in FIG. 8, in the coordinate input device 1a of the second embodiment, the result of dragging at a short distance near the outer circumference of the touch-pad 2 by the calculation unit 6 of the controller 3 is set to be the same as the result of dragging at a long distance near the central point P of the touch-pad 2.

Figure 9:
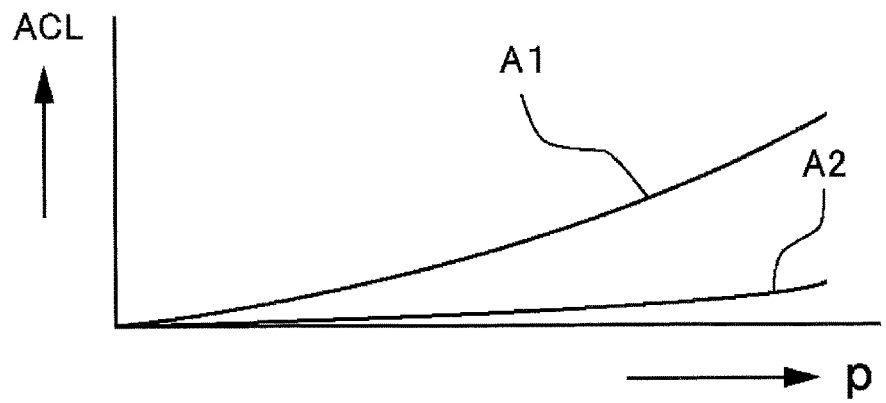
FIG. 9 is a graph illustrating the relationship between the difference in positions at which the touch-pad is operated and the coordinate movement coefficient ACL.

Here, in the coordinate movement coefficient "ACL=f(p)×f(v)", when p is minimized, the result of the calculation when p is maximized is illustrated in FIG. 9. In FIG. 9, line A1 is the curve when p is shaken maximally, and line A2 is the curve when p is shaken minimally.

Thus, near the central point P of the touch-pad 2, the coordinate movement coefficient increases as the operation speed of the finger increases, but the rate of increase is small. On the other hand, in the vicinity of the outer circumference of the touch-pad 2, the rate of increase in the coordinate movement coefficient increases as the operation speed of the finger increases.

Figure 10:
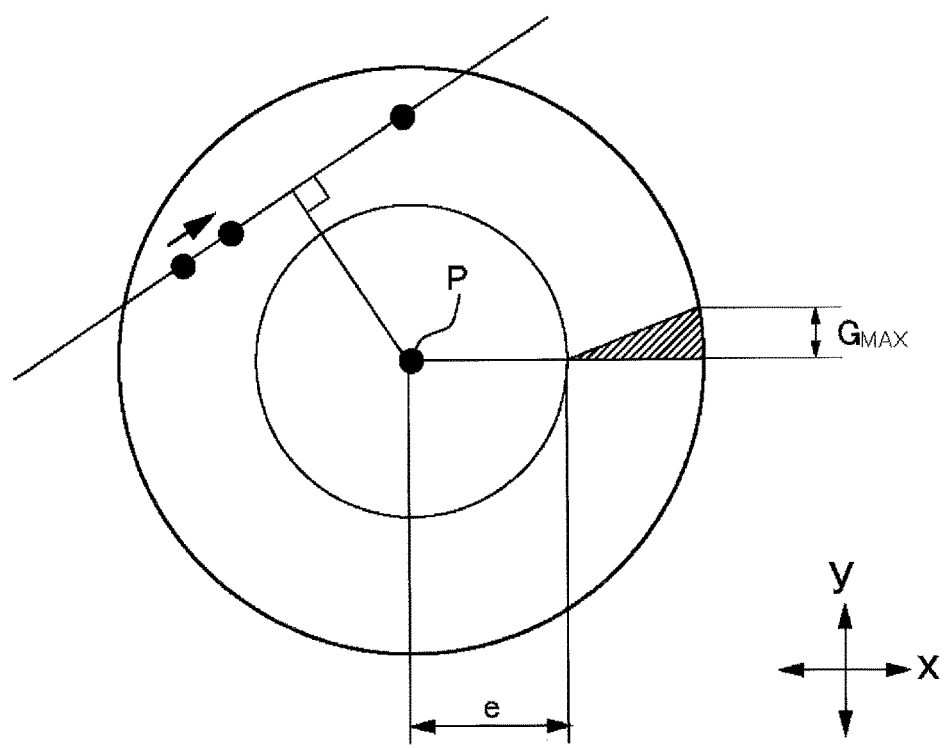
FIG. 10 explains a coordinate input device of a modified example of the second embodiment.

Next, a modification of the coordinate input device 1a of the second embodiment will be described with reference to FIG. 10. In this modification, the method for calculating the transfer function f(p), which is a magnification that increases the amount of coordinate movement from the length p of the perpendicular line, differs from the second embodiment described above.

In this modification, the transfer function f(p) is determined by Equation 4 below rather than Equation 3. In Equation 4, as illustrated in FIG. 10, the increasing factor from the distance e to the outer circumference is gradually increased to the maximum (GMAX) at the position of the outer circumference of the touch-pad 2, with the increasing factor of 0 (GMIN) from the central point P to the distance e.

[Formula 4]
$$f(p) = G_{MIN} + \frac{(p-e)(G_{MAX} - G_{MIN})}{(r-e)} \quad \text{(EQUATION 4)}$$

According to the transfer function f(p), when the user operates around the central point P of the touch-pad 2 with his fingers, there is no change in the magnitude of the output vector relative to the input vector. On the other hand, when the user operates around the outer circumference of the touch-pad 2 with his fingers, the increase factor of the output vector relative to the input vector increases as the outer circumference is approached, so that the user can operate without a feeling of strangeness even if the movable distance is shortened.

In the above embodiment, a specific example of the transfer function or other calculation formula is illustrated. However, in the coordinate input device of the present invention, a suitable calculation formula can be selected and used without limiting it to the above embodiment. In addition, the coordinate input device of the present invention can be broadly applied to electronic devices such as personal computers, as well as home appliances such as refrigerators and ranges, in addition to those used in automobiles.

1, 1a: coordinate input device
2: touch-pad (operation detecting unit)
3: controller
4: display
5: input unit
6: calculation unit
7: memory unit
8: output unit
V1, V2, V3, V7, V8: input vector
V4, V5, V6, V9, V10: output vector According to the present invention, a coordinate input device such as a touch-pad that does not cause a feeling of strangeness to the user can be provided at a time of inputting into the coordinate input device, regardless of its shape.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the coordinate input device has been described in detail, it should be understood that various changes, substitutions, and alterations could be made thereto without departing from the spirit and scope of the invention.

What is claimed is:

1. A coordinate input device comprising:
an operation detecting unit configured to detect an input operation performed by an operation body; and
a calculation unit configured to compute a calculation result by calculating the result of the input operation,
wherein, in a case where the input operation detected by the operation detecting unit continues for a predetermined time, the calculation unit
acquires a first position coordinate of a first position at a first time and a second position coordinate of a second position at a second time that is detected after the first time,
calculates an input vector that starts from the first position and directed toward the second position,
calculates a movable distance that is a distance between an end of the operation detecting unit and another end of the operation detecting unit on a line connecting the first position and the second position, and
computing an output vector by increasing a correction value for correcting a value of the input vector so that the shorter the movable distance, the larger the correction value is.

2. The coordinate input device according to claim 1, wherein the shape of the operation detecting unit is circular, elliptical, or oval with rounded corners.

3. The coordinate input device according to claim 1, wherein the calculation unit calculates a time between the first time and the second time and a movement speed of the operation body using the amount of movement from the first position coordinate to the second position coordinate, and decreases the correction value when the movement speed is less than or equal to a predetermined threshold value.

4. A coordinate input device comprising:
an operation detecting unit configured to detect an input operation performed by an operation body; and
a calculation unit configured to compute a calculation result by calculating the result of the input operation,
wherein, in a case where the input operation detected by the operation detecting unit continues for a predetermined time,
the calculation unit
acquires a first position coordinate of a first position at a first time and a second position coordinate of a second position at a second time that is detected after the first time,
calculates an input vector that starts from the first position and directed toward the second position,
acquiring a length of a perpendicular line from a line connecting the first position and a second position to a reference point of the operation detecting unit, and
computing an output vector by increasing a correction value for correcting a value of the input vector so that the longer the length of the perpendicular line, the larger the correction value is.

5. The coordinate input device according to claim 4, wherein the shape of the operation detecting unit is circular, elliptical, or oval with rounded corners.

6. The coordinate input device according to claim 4, wherein the calculation unit calculates a time between the first time and the second time and a movement speed of the operation body using the amount of movement from the first position coordinate to the second position coordinate, and decreases the correction value when the movement speed is less than or equal to a predetermined threshold value.

* * * * *